US008864967B2

(12) United States Patent
Marchand et al.

(10) Patent No.: US 8,864,967 B2
(45) Date of Patent: Oct. 21, 2014

(54) DEVICE FOR MOVING AND TREATING VOLUMES OF LIQUID

(75) Inventors: Gilles Marchand, Pierre Chatel (FR); Yves Fouillet, Voreppe (FR); Philippe Clementz, Riedisheim (FR)

(73) Assignee: Commissariat a l'Energie Atomique, Paris (FR)

( * ) Notice: Subject to any disclaimer, the term of this patent is extended or adjusted under 35 U.S.C. 154(b) by 1967 days.

(21) Appl. No.: 11/631,389

(22) PCT Filed: Jun. 30, 2005

(86) PCT No.: PCT/FR2005/050527

§ 371 (c)(1), (2), (4) Date: Dec. 29, 2006

(87) PCT Pub. No.: WO2006/013303

PCT Pub. Date: Feb. 9, 2006

(65) Prior Publication Data

US 2008/0302431 A1 Dec. 11, 2008

(30) Foreign Application Priority Data

Jul. 1, 2004 (FR) ..................................... 04 51400

(51) Int. Cl.

*B01D 59/42* (2006.01)
*F04B 19/00* (2006.01)
*B01L 3/00* (2006.01)

(52) U.S. Cl.

CPC ... *B01L 3/502792* (2013.01); *B01L 2400/0427* (2013.01); *B01L 2300/1827* (2013.01); *B01L 3/5025* (2013.01); *F04B 19/006* (2013.01); *B01L 2300/089* (2013.01); *B01L 2300/1816* (2013.01); *B01L 2300/165* (2013.01); *B01L 2300/0645* (2013.01)

USPC ...... 204/409; 204/403.03; 204/549; 204/556; 137/826

(58) Field of Classification Search

CPC ................ B01L 2200/0626; B01L 2200/0652; B01F 13/0069; B01F 13/0071; B01F 13/0072; B01F 13/0005; B01F 13/0006; B01F 3/807; B01D 59/38; B01D 59/40; B01D 59/42; G01N 2001/4038

USPC .......... 204/400–435; 137/1–9, 825–826, 545; 435/173.4–173.6, 446, 450; 422/502–504; 205/775–794.5

See application file for complete search history.

(56) References Cited

U.S. PATENT DOCUMENTS 4,636,785 A 1/1987 Le Pesant
6,565,727 B1 5/2003 Shenderov (Continued)

FOREIGN PATENT DOCUMENTS

FR 2 841 063 12/2003
WO WO 99/54730 10/1999

OTHER PUBLICATIONS

Washizu et al, IEEE Industry Applications Society, 1997, pp. 1867-1873.*

B. Tremillon, "Electrochimie Analytique et Reactions en Solution", Tome 2, 1993, pp. 1-53, (with partial English translation).

(Continued)

*Primary Examiner* — Susan D Leong

(74) *Attorney, Agent, or Firm* — Oblon, Spivak, McClelland, Maier & Neustadt, L.L.P.

(57) ABSTRACT

A device for displacing a small volume of liquid under the effect of an electric control, including a first substrate with a hydrophobic surface provided with a first electrical conductor, a second electrical conductor positioned facing the first conductor, and a third conductor, forming with the second conductor, a mechanism for analyzing or heating a volume of liquid.

26 Claims, 8 Drawing Sheets

(56) References Cited

U.S. PATENT DOCUMENTS

| | | | | |
|---|---|---|---|---|
| 7,052,244 | B2 | 5/2006 | Fouillet et al. | |
| 2001/0055529 | A1 | 12/2001 | Wixforth | |
| 2004/0007377 | A1 | 1/2004 | Fouillet et al. | |
| 2004/0055891 | A1 | 3/2004 | Pamula et al. | |
| 2004/0231987 | A1 * | 11/2004 | Sterling et al. ................ | 204/450 |

OTHER PUBLICATIONS

M. G. Pollack, et al., "Electrowetting-based actuation of droplets for integrated microfluidics", LAB on a CHIP, The Royal Society of Chemistry, vol. 2, 2002, pp. 96-101.

Chao-Yi Chen, et al., "Electrowitting-Based Microfluidic Devices: Design Issues", 2003 Summer Bioengineering Conference, Jun. 25-29, 2003, Two pages.

* cited by examiner

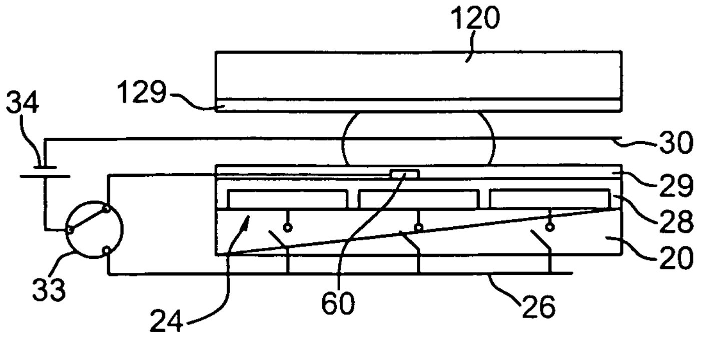
FIG. 6
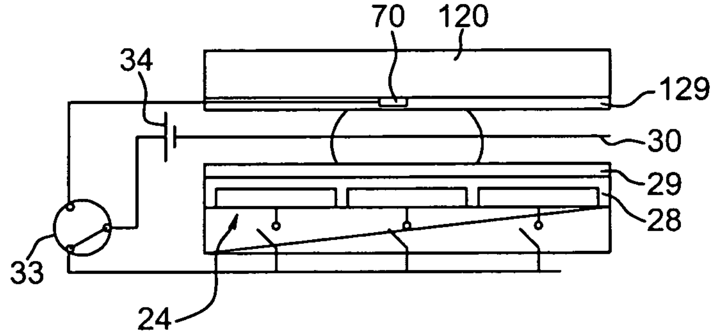
FIG. 7
FIG. 8A
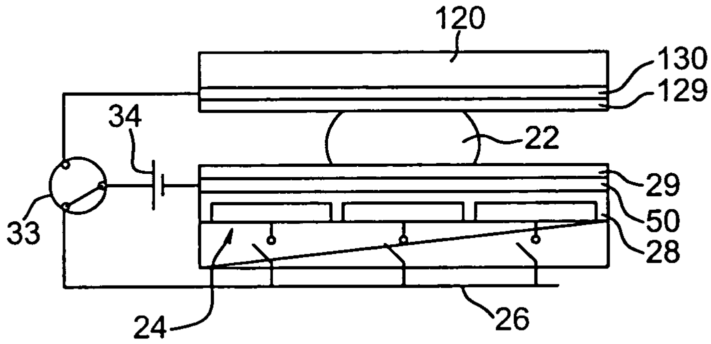

DEVICE FOR MOVING AND TREATING VOLUMES OF LIQUID

TECHNICAL FIELD AND PRIOR ART

The invention relates to a device and a method for displacing small volumes of liquid, applying electrostatic forces in order to obtain this displacement.

The invention notably relates to a discrete microfluidic or drop microfluidic handling device, for chemical or biological applications.

One of the most used displacement or handling methods, is based on the principle of electrowetting on a dielectric, as described in the article of M. G. Pollack, A. D. Shendorov, R. B. Fair, entitled <<Electro-wetting-based actuation of droplets for integrated microfluidics>>, Lab Chip 2 (1) (2002) 96-101.

The forces used for the displacement are electrostatic forces.

Document FR 2 841 063 describes a device applying a catenary facing activated electrodes for the displacement.

The principle of this type of displacement is synthesized in FIGS. 1A-1C.

A drop 2 lies on an electrode network 4 from which it is isolated by a dielectric layer 6 and a hydrophobic layer 8 (FIG. 1A).

When the electrode 4-1 located near the drop 2 is activated, the dielectric layer 6 and the hydrophilic layer 8 between this activated electrode and the drop polarized by an electrode 10, act as a capacitor. Electrostatic charge effects induce the displacement of the drop on this electrode. The electrode 10 may be a catenary, it then keeps electric contact with the drop during its displacement as described in document FR-2 841 063 (FIG. 2A).

The drop may thereby be displaced gradually (FIG. 1C), on the hydrophobic surface 8, by successively activating electrodes 4-1, 4-2, . . . etc. and by guiding it along the catenary 10.

It is therefore possible to displace liquids, but also to mix them (by having drops of different liquids approach each other), and to perform complex protocols.

The documents cited above give examples of applications of series of adjacent electrodes for handling a drop in a plane.

This type of displacements is increasingly used in devices, for biochemical, chemical or biological analyses, whether in the medical field or in monitoring the environment, or in the quality control field.

In certain cases, the problem is posed of performing a displacement and a detection of a characteristic of a volume of liquid, either displaced or to be displaced.

The problem is then often posed of the number of contacts on the chip on which the displacement occurs, as well as the problem of how to bring the block to be analyzed towards a detection area.

This is notably the case, but not only, when drop displacement and detection for example of a product solubilized in this drop, are perfectly dissociated.

The problem is then posed of finding a new device with which drops or microdrops of small liquid volumes may be displaced and analyzed or treated more easily.

SUMMARY OF THE INVENTION

The invention relates to a device for displacing a small volume of liquid under the effect of an electric control, including a first substrate with a hydrophobic surface, provided with first electrically conducting means, with second electrically conducting means positioned facing the first conducting means, or corresponding to these first means, or facing the portion of the hydrophobic surface which covers the first electrically conducting means, including third conducting means forming with the second conducting means, analysis means or reaction inducing means or heating means for a volume of liquid.

One of the second and third electrically conducting means may be used in the phase for displacing the drops of liquids of interest in order to bring the drop onto the desired area of the first electrically conducting means, the second electrically conducting means being associated with the third means as a pair, for example a pair of electrodes in electrical contact with the drop or the liquid, so as for example, to achieve electrochemical detection of a a redox species present in the drop(s) (detection with two electrodes), and an electrophoretic system or a heating system or other reactions.

Thus, one of the second and third electrically conducting means accomplishes two functions.

First, a displacement function alone and combined with the underlying electrodes, is provided by applying voltage to the drop for electrowetting.

Next, coupled with other means from the second and third electrically conducting means, a second function is provided, which is a detection function, for example an electrochemical function.

The second electrically conducting means will then either be a working electrode, or a counter electrode.

These second means will act both as reference electrode and counter electrode, the role of the second electrode depending on that of the first.

According to one embodiment, the second conducting means include a catenary or a wire, substantially parallel to the hydrophobic surface.

The catenary or the wire may be non-buried in the first substrate, at a non-zero distance from the hydrophobic surface, for example between 1 μm and 100 μm or 500 μm.

The third conducting means may also include a catenary or a wire, which may be non-buried in the first substrate, at a non-zero distance from the hydrophobic surface, for example between 1 μm and 100 μm or 500 μm.

Both catenaries or wires may be parallel to each other and to the hydrophobic surface.

Both catenaries or wires may not be parallel to each other, but may remain parallel to the hydrophobic surface.

One of the catenaries may be buried under the hydrophobic surface.

The catenaries may be directed substantially parallel to each other.

The third conducting means may include a planar conductor buried under the hydrophobic surface.

The second conducting means may include a catenary or a wire buried under the hydrophobic surface.

The third conducting means may then also include a catenary or a buried wire, both buried catenaries being directed substantially parallel to each other.

The third conducting means may include a planar electrode buried under the hydrophobic surface.

The second conducting means may include a buried planar electrode.

The third conducting means may then include a buried conductor, with a planar or wire shape.

The third conducting means may include a catenary or a wire directed perpendicularly to the catenary or wire of the second electrically conducting means.

A device as described above may further include a second substrate with a hydrophobic surface, this second substrate giving a confined structure to the whole.

It may also further include a second substrate with a hydrophobic surface, this second substrate giving a combined structure to the whole, the third conductor being buried in the second substrate, under its hydrophobic surface.

The third conductor may then be as a buried catenary or wire, or else as a buried planar conductor.

In such a device, the surface of the second substrate may be locally apertured in order to form a contact area between a drop of liquid positioned between both substrates and the third conductor.

The second substrate may also be positioned at a distance from the first substrate between 10 μm and 100 μm or 500 μm.

A device as described above may further include a second substrate with a hydrophobic surface, this second substrate giving a confined structure to the whole, the second and the third conductors being buried in the second substrate, under its hydrophobic surface.

The second and third conductors may then each be as a catenary or a wire.

The invention also relates to a method for treating a drop of liquid, for example by electrochemical reaction or detection, or by electrophoresis or by the Joule effect, or for treating a cell by cell lysis or by electroporation, including:

putting a drop of liquid in contact with the electrodes of a device as described above, applying a potential difference between the first and second conducting means.

The second electrically conducting means, or both electrodes, may therefore for example provide electrophoretic separation and/or a heating function.

In a device according to the invention, switching from a displacement configuration to a reaction or read-out or heating configuration may be fast, so that several drops may be treated one after the other, in a continuous flux dosage protocol, for example, or for analyses with high flow rates.

SHORT DESCRIPTION OF THE FIGURES

FIGS. 3A, 3B, 4A, 4B, 5, 6, 7, 8A, 8B, 9A, and 9B illustrate other alternatives and other embodiments of the invention.

Figure 10A:
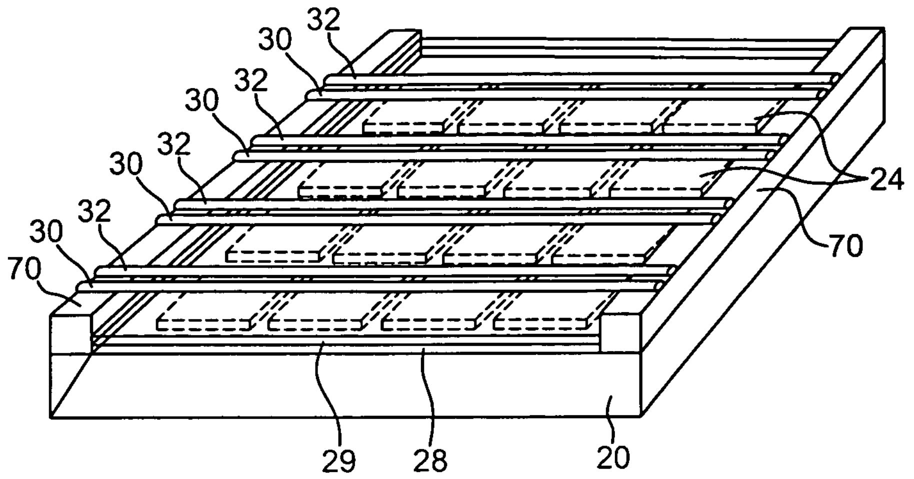
Figure 10B:
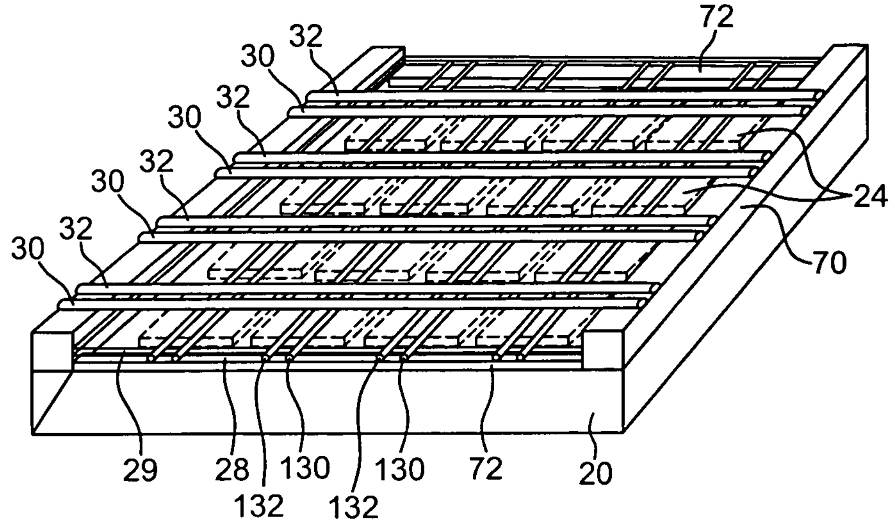

FIGS. 10A and 10B illustrate two-dimensional alternatives of the invention.

Figure 11:
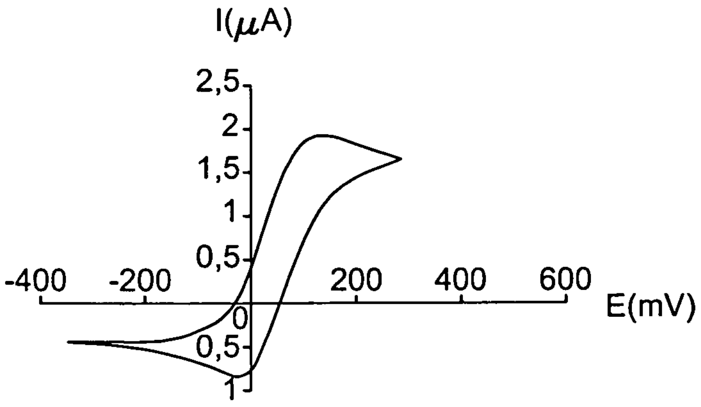

FIG. 11 illustrates the detection between two catenaries of the $Fe^{II/III}$ pair.

Figure 12:
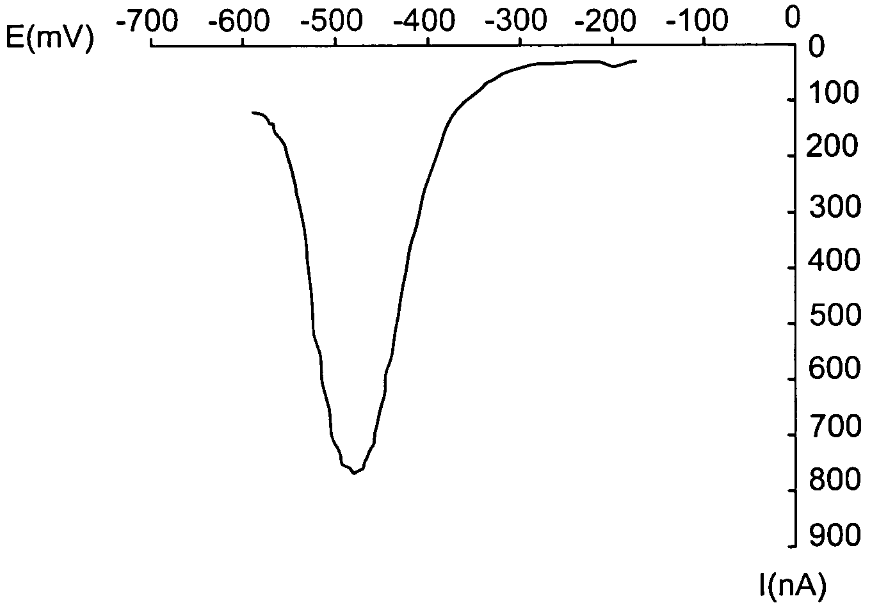

FIG. 12 illustrates the electrochemical detection of a species generated by an enzyme.

Figure 13A:
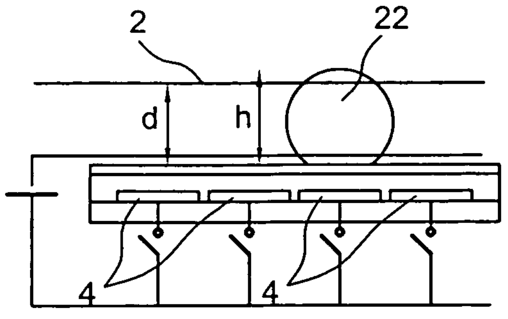
Figure 13B:
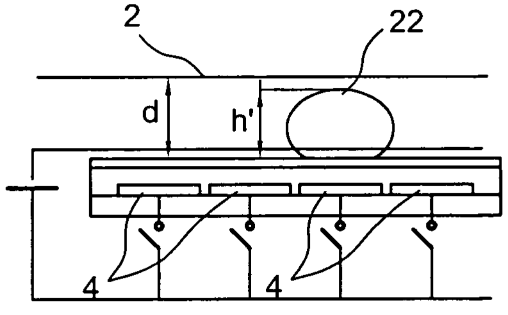

FIGS. 13*a* and 13*b* are schematic illustrations of an exemplary embodiment of a device according to the present invention with which a drop of liquid may be calibrated during different calibration steps.

DETAILED DESCRIPTION OF EMBODIMENTS OF THE INVENTION

Figure 1A:
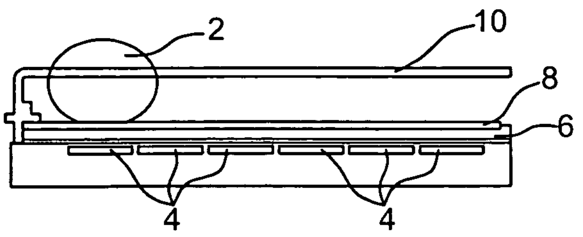
FIGS. 1A-1C illustrate the displacement principle of a drop on an electrode matrix by electrowetting.
Figure 1B:
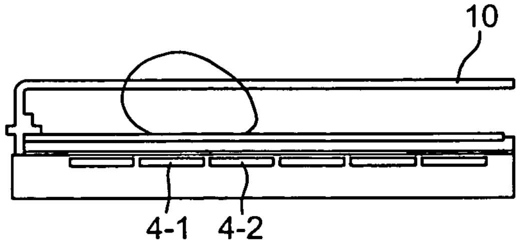
Figure 1C:
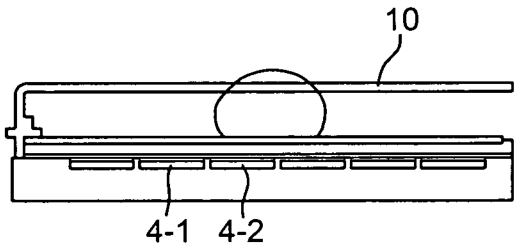
Figure 2A:
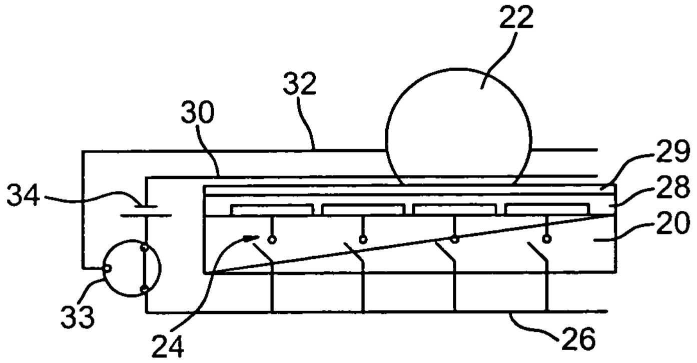
FIGS. 2A-2C illustrate an embodiment of the invention.
Figure 2B:
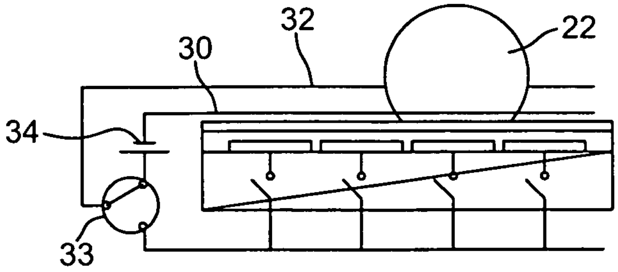

A first exemplary embodiment of the invention is illustrated in FIGS. 2A and 2B.

A device or a microfluidic component, according to the invention includes a lower substrate 20, provided with a matrix 24 of independent electrodes.

Each of these electrodes 24 is electrically connected to a conductor 26.

The electrodes 24 are covered with an insulating layer 28 and a hydrophobic layer 29.

The hydrophobicity of this layer means that a drop 22 has a contact angle on this layer, larger than 90°.

A single layer may combine both of these functions, a Teflon layer for example.

This device includes a first catenary 30, allowing electrowetting, and a second catenary 32 forming an electrode pair with the first catenary 30.

The first catenary is located facing the electrodes 24 or the portion of the hydrophobic surface 29 located above the electrodes 24.

Power supply means 34 connect these different electrodes to each other.

In FIGS. 2A-2B, these power supply means may be switched in two ways, by switching means 33.

First of all, for displacing a drop 22, one or more of the electrodes 24 are energized with a voltage, as well as the catenary 30; this configuration is illustrated in FIG. 2A; as already explained above, activation of one of the electrodes 24 will induce a displacement of the drop 22.

Next, for measurements, a voltage is applied to each of the catenaries 30 and 32, generating a non-zero potential difference between both of these catenaries, which may induce an electrochemical reaction in the drop 22, and/or heating of this drop, and/or detection or an electroporation reaction and/or a cell lysis type reaction in this drop if a cell is present in the drop.

This configuration is illustrated in FIG. 2B.

Possibly, with switching means, or by second voltage generating means, not shown in FIGS. 2A-2B, a voltage may be applied to one or several of the electrodes 24, simultaneously with the voltage applied between the catenaries 30 and 32, which may cause displacement of the drop 22 at the same time as the reaction above.

The use of two electrodes 30, 32 as catenaries, parallel to each other and to the alignment of the electrodes 24, allows the desired reaction to be conducted in the drop at any intended location of this alignment. It is possible to bring the drop over any of the electrodes 24 and produce the desired reaction therein by activating a non-zero potential difference between both catenaries 30 and 32.

One of the two catenaries is therefore bifunctional and may be used for displacement on the hydrophobic surface 29 or for any electrochemical reaction or any other reaction for which two electrodes are needed (for example: electrophoresis, electroporation, cell lysis).

Figure 2C:
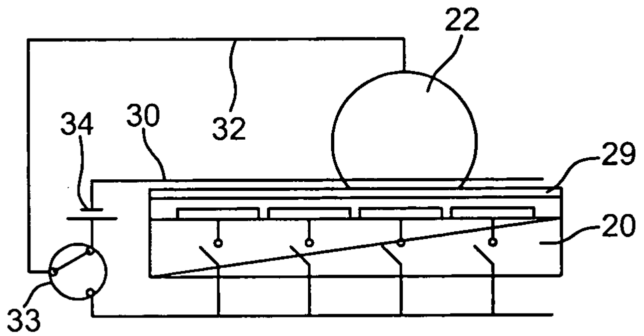

According to one alternative, illustrated in FIG. 2C, the second conductor may be positioned along a direction different from the first conductor. For example, the catenary 30 is kept parallel to the alignment of the electrodes 24, while the second catenary is directed substantially perpendicularly to the first catenary, but parallel to the plane of the layer 29 and of the substrate 20, or else it (FIG. 2C) is directed substantially perpendicularly to the plane of the layer 29 and of the substrate 20.

Displacement of the drop 22 of liquid occurs in the same way as above, while a reaction or heating is induced by establishing a non-zero potential difference between the electrodes 30 and 32.

An alternative of the device described above is illustrated in FIGS. 3A and 3B, in which numerical references identical with those of FIGS. 2A-2C, designate identical or similar components therein.

One of the catenaries is further located above the substrate (the catenary 30 here, but this may be the catenary 32). Another electrode 40, here a catenary, is buried in the substrate 20, for example under the hydrophobic layer 29. This buried electrode may be planar instead of being a catenary.

Figure 3A:
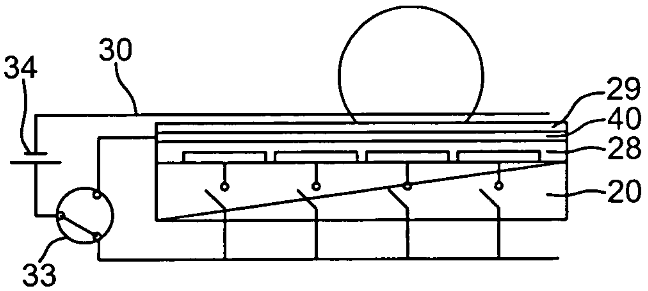

For displacement of a drop 22, one or several of the electrodes 24 are energized with a voltage, as well as the catenary 30 for example. This might also be the electrode 40 which is energized with a voltage instead of the catenary 30; this configuration is illustrated in FIG. 3A; as already explained above, activation of one of the electrodes 24 will induce displacement of the drop 22.

Next, for measurements, a voltage is applied between the catenaries 30 and 40, generating a potential difference between both of these catenaries, which may induce an electrochemical reaction/detection in the drop 22, and/or heating of this drop, and/or an electroporation reaction and/or a cell lysis type reaction of cells present in the drop.

Figure 3B:
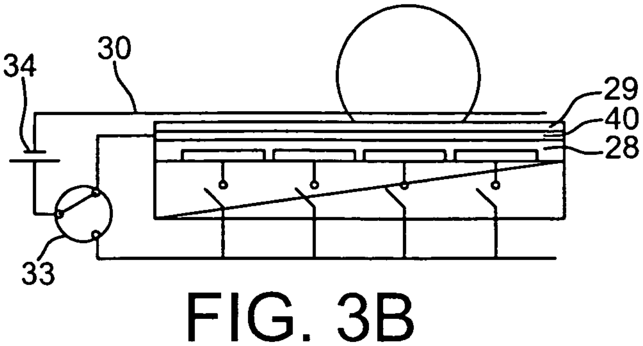

This configuration is illustrated in FIG. 3B.

There again, displacement and reaction or heating may be simultaneous, by means of adequate switching means or second voltage generating means.

Figure 4A:
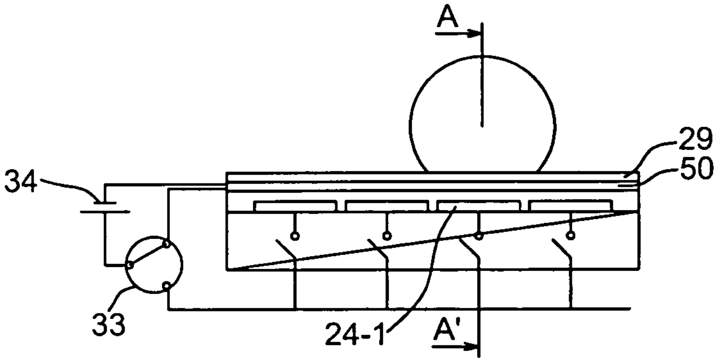
Figure 4B:
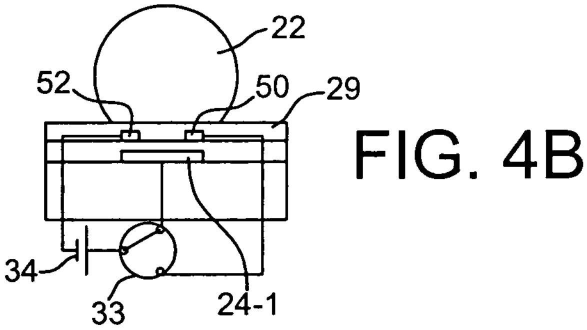

Still another alternative of this device is illustrated in FIGS. 4A and 4B, in which numerical references identical with those of FIGS. 2A-2C, designate identical or similar components therein.

None of the catenaries are located any longer above the substrate. On the other hand, two catenaries 50 and 52 are buried in the substrate 20, for example under the hydrophobic layer 29.

FIG. 4A illustrates a longitudinal view of the device, on which only one of the two buried catenaries is visible, hiding the second, while FIG. 4B illustrates a sectional view AA' of the device, on which both buried catenaries 50, 52 are visible, above an electrode 24-1 which hides the other electrodes of the network 24. In this FIG. 4B, voltage generating means 34 are also illustrated as well as the switching means 33.

For displacing a drop 22, one or several of the electrodes 24 are energized with a voltage, as well as the catenary 52 for example; this configuration is illustrated in FIGS. 4A and 4B; as already explained above, activation of one of the electrodes 24 will induce a displacement of the drop 22.

Next, for measurements, a voltage is applied to each of the catenaries 50 and 52 by means 34 and 33 (a situation not shown in the figures), generating a non-zero potential difference between both of these catenaries, which may induce heating of this drop, and/or an electroporation reaction and/or a cell lysis type reaction of this drop.

The invention also relates to other embodiments, notably of the confined type, with an upper substrate.

Thus, according to another embodiment, it is possible to make a device in the form of a so-called closed system, with an upper substrate which confines the drop.

Figure 5:
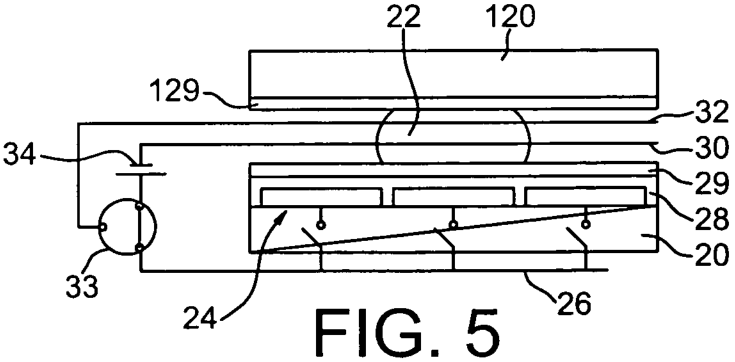

Such an embodiment is illustrated in FIG. 5, in which numerical references identical with those of FIGS. 2A-2B, designate identical or similar components therein.

An upper substrate 120 includes a hydrophobic layer 129 for example in Teflon. Like layer 29, it is in contact with the drop 22.

Both conductors 30, 32, are located in this example between both substrates 20, 120 and are both in direct, mechanical and electrical contact with the drop 22.

The operation of this type of device is the same as the one discussed above in connection with FIGS. 2A and 2B, the only difference lying in the confinement of the drop.

In FIG. 5, the device is illustrated in a displacement position of the drop, a reaction or heating being induced by switching of the switching means 33. There again, displacement and reaction or heating may be induced simultaneously, by appropriate switching means or by a second voltage source.

According to an alternative of this embodiment, one of the two conductors allowing a reaction to be induced in the drop, may be buried in the lower substrate 20.

For example, in FIG. 6, in which numerical references identical with those of FIGS. 2A-2C, designate identical or similar components therein, one of the catenaries is again located above the substrate (the catenary 30 here, but it may be the catenary 32). Another electrode 60, for example a catenary, is buried in the substrate 20, for example under the hydrophobic layer 29, leaving the conductor 30 alone in mechanical and electrical contact with the drop.

This embodiment allows the drop to be displaced by means of the conductors 24 and of the conductor 30, and a reaction to be induced with application of a voltage difference between the conductors 60 and 30 (which is illustrated in FIG. 6).

The buried electrode 60 may have the shape either of a linear conductor or a catenary, or the shape of a planar conductor.

When it has the shape of a linear conductor, it may be oriented along a direction which is not necessarily parallel to the direction of the catenary 30, as illustrated in FIG. 6, in which both catenaries are substantially perpendicular; and the advantage of the structure is then that only one drop at a time is in electrical contact with both electrodes. Or else both electrodes 30, 60 may be parallel to each other (for example, as illustrated in FIGS. 3A and 3B), with which the desired reaction may be conducted at any location above the electrodes 24. The same advantage is provided when the buried electrode 60 has the shape of a planar conductor.

For displacing a drop 22, one or several of the electrodes 24 are energized with a voltage, as well as the catenary 30; as already explained above, activation of one of the electrodes 24 will induce displacement of the drop 22.

Next, for measurements, a voltage is applied to each of the catenaries 30 and 60, generating a potential difference between both catenaries, which may induce an electrochemical reaction in the drop 22, and/or heating of this drop, and/or an electroporation reaction and/or a cell lysis type reaction of this drop. This configuration is illustrated in FIG. 6.

According to still another alternative of this embodiment, one of the two conductors allowing a reaction to be induced in the drop, may be buried in the upper substrate 120.

For example, in FIG. 7, in which numerical references identical with those of FIGS. 2A-2C, designate identical or similar components therein, one of the catenaries is again located above the substrate (the catenary 30 here, but it may be the catenary 32).

Another electrode 70, for example a catenary, is buried in the substrate 120, for example under the hydrophobic layer 129, leaving the conductor 30 alone in mechanical and electrical contact with the drop.

This embodiment allows the drop to be displaced by means of the conductors 24 and of the conductor 30, and a reaction to be induced with application of a voltage difference between the conductors 70 and 30.

The buried electrode 70 may have the shape either of a linear conductor or catenary, or the shape of a planar conductor.

When it has the shape of a linear conductor, it may be oriented along a direction which is not necessarily parallel to the direction of the catenary 30 (as illustrated in FIG. 7, in which both catenaries are substantially perpendicular), or else both conductors may be parallel to each other (for example, as illustrated in FIGS. 3A and 3B), which allows the desired reaction to be conducted in any location above the electrodes 24. The same advantage is provided when the buried electrode 70 has the shape of a planar conductor.

For displacing a drop 22, one or several of the electrodes 24 are energized with a voltage, as well as the catenary 30; this configuration is illustrated in FIG. 7; as already explained above, activation of one of the electrodes 24 will induce displacement of the drop 22.

Next, for measurements, a voltage is applied to each of the electrodes 30 and 70, generating a non-zero potential difference between them, which may induce an electrochemical reaction in the drop 22, and/or heating of this drop, and/or an electroporation reaction and/or a cell lysis type reaction in this drop.

According to still another alternative, each of the two conductors with which a reaction may be induced in the drop, is buried in one of the substrates.

Thus, in FIG. 8A, in which numerical references identical with those of FIGS. 2A-2C, designate identical or similar components therein, one of the catenaries is buried in the substrate 20, under the hydrophobic layer 29, for example.

The other electrode 130, for example a catenary, is buried in the substrate 120, above the hydrophobic layer 129, for example.

None of the conductors are in mechanical contact with the drop.

This embodiment allows the drop to be displaced by means of the conductors 24 and of the conductor 50 and a reaction to be induced with application of a voltage difference between the conductors 130 and 50.

Each of the buried electrodes 50, 130 may have the shape either of a linear conductor or a catenary, or the shape of a planar conductor.

When they both have the shape of a linear conductor, they may be oriented along directions which are not necessarily parallel to each other (as illustrated in FIG. 7, in which both catenaries are substantially perpendicular), or else both conductors may be parallel to each other (for example, as illustrated in FIG. 8A), which allows the desired detection or reaction to be conducted at any location above the electrodes 24. The same advantage is provided when one of the two buried electrodes has the shape of a planar conductor (notably that of the substrate 120) while the other one has the shape of a linear conductor aligned above the electrodes 24 or when both electrodes each have the shape of a planar conductor.

For displacing a drop 22, one or several of the electrodes 24 are energized with a voltage, as well as the electrode 50; this configuration is illustrated in FIG. 8A; as already explained above, activation of one of the electrodes 24 will induce displacement of the drop 22.

Next, for measurements, a voltage is applied to each of the electrodes 130 and 50, generating a non-zero potential difference between them, which may induce heating in the drop 22, and/or an electroporation reaction, and/or a cell lysis type reaction in this drop if there are cells in the drop.

Figure 8B:
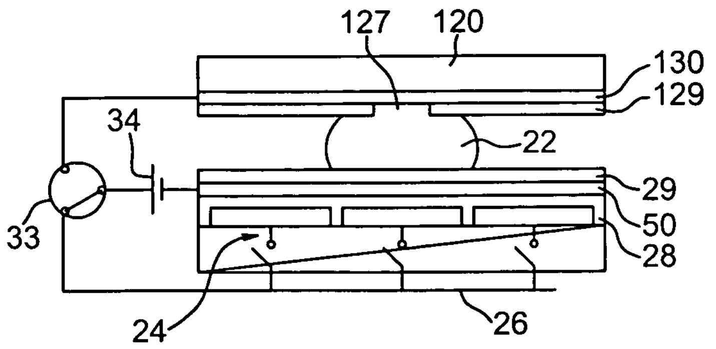

According to an alternative of this embodiment, illustrated in FIG. 8B, in which numerical references identical with those of FIGS. 2A-2C, designate identical or similar components therein, one of the buried conductors, for example the conductor 130 of the upper substrate 120, is locally in physical contact with the drop 22 because of an aperture 127 provided in the hydrophobic layer 129, for example by lithography and then etching of this layer 129.

In this case, for measurements, a voltage is applied to each of the electrodes 130 and 50, generating a potential difference between both of these electrodes, which may induce:

an electrochemical reaction in the drop 22 when it is in direct contact with the electrode 130 through the aperture 127, and/or, regardless of the position of the drop relatively to the aperture 127, heating of this drop and/or an electroporation reaction and/or a cell lysis type reaction in this drop if there are cells in the drop.

It is possible to have an alternative in which the aperture is provided in the layer 29 of the lower substrate, for a contact between the drop 22 and the conductor 50.

According to still another alternative of this device, both electrodes are both located either in the lower substrate or in the upper substrate. None of the electrodes are located any longer in mechanical contact with the drop.

The case of two buried electrodes in the lower substrate is similar to the case discussed above in connection with FIGS. 4A-4B, to which an upper substrate 120 such as the one of FIG. 6, would be added for confining the drop 22.

Figure 9A:
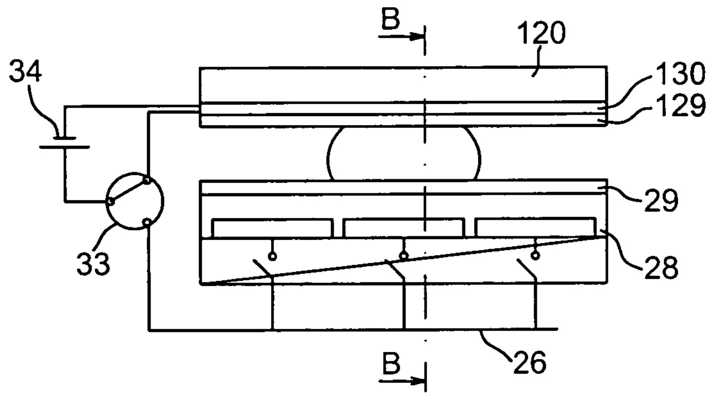
Figure 9B:
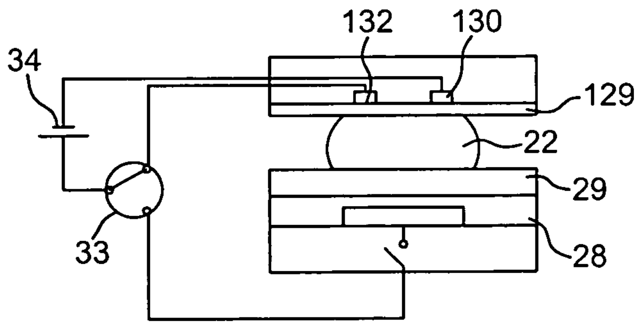

The case of two buried electrodes in the upper substrate is illustrated in FIGS. 9A-9B, in which numerical references identical with those of FIGS. 2A-2C, designate identical or similar components therein.

Two catenaries 130 and 132 are buried in the substrate 120, under the hydrophobic layer 129, for example.

FIG. 9A illustrates a longitudinal view of the device, in which only one of the two buried catenaries is visible, hiding the second one.

FIG. 9B illustrates a sectional view BB' of the device, in which both buried catenaries 130, 132 are visible, above an electrode 24-1 which hides the other electrodes of the network 24.

For displacing a drop 22, one or several of the electrodes 24 are energized with a voltage, as well as the catenary 130 for example; as already explained above, activation of one of the electrodes 24 will induce a displacement of the drop 22.

Next, for measurements, a voltage is applied to each of the catenaries 130 and 132, generating a potential difference between both catenaries, which may induce heating of this drop, and/or an electroporation reaction and/or a cell lysis type reaction in this drop (this configuration is illustrated in FIGS. 9A and 9B).

The invention may be applied with a row of electrodes 24, hence a linear arrangement of these electrodes.

These electrodes may however, within the scope of the invention, be positioned according to any scheme, and in particular in 2 dimensions.

Another aspect of the invention is therefore illustrated by FIGS. 10A and 10B, in which numerical references identical with those of FIGS. 2A-2C, designate identical or similar components therein.

In FIG. 10A, the substrate 20 supports a matrix 24 of electrodes, distributed in lines and columns, covered with an insulating layer 28 and with a hydrophobic layer 29.

Several pairs of microcatenaries 30, 32, are placed in parallel along the lines of electrodes.

These microcatenaries may be positioned at a given distance from the surface of the substrate by means of spacers 70.

In this way, it is possible to operate in parallel on several lines of electrodes, and to displace several drops by the methods described earlier.

The technique of the spacers may also be used in connection with the other embodiments in order to keep a catenary at a predetermined distance from the hydrophobic layer 29.

Another aspect of the invention is illustrated in FIG. 10B. The substrate 20 supports a matrix of electrodes 24, distributed in lines and columns, covered with a fine insulating layer 28 and a hydrophobic layer 29.

A first series of microcatenaries 30, 32 is put in parallel along the lines of electrodes.

These micro-catenaries are positioned at a given distance from the surface of the substrate by means of the spacers 70.

A second series of micro-catenaries 130, 132 is put in parallel but placed perpendicularly to the series of microcatenaries 30, 32 i.e. along the direction of the columns of electrodes 24.

These microcatenaries are positioned at a given distance from the surface of the substrate by means of spacers 72.

Spacers 70 and 72 may be of different heights. Thus, it is possible to displace drops along two perpendicular directions.

As regards the reaction or heating to be induced in a drop of liquid, these 2D embodiments operate in the same way as described above in connection with FIGS. 2A-9B: activation of two neighboring electrodes 30, 32 or 130, 132 induces a potential difference between both of these electrodes and a reaction or heating in the liquid of the drop.

The electrodes of these 2D embodiments are connected to switching means, not shown in FIGS. 10A and 10B, but analogously to what was described above in connection with the previous figures.

These 2D embodiments may also apply the following features, taken either alone or combined:

- one or two buried electrodes for one or several lines and/or columns of electrodes 24,
- a second confinement substrate, provided with a hydrophobic surface, with possibly, there again, one or two buried electrodes for one or several lines and/or columns of electrodes 24. The hydrophobic surface of the second substrate may be provided with contact apertures such as the aperture 127 of FIG. 8B.

Generally, in the embodiments applying one or more buried conductors, a wiring step is spared additionally (the wetted surface is only localized on the hydrophobic surfaces 29 and 129) the wetting properties of the corresponding layer 29, 129 are then used optimally.

Typically, the distance between the conductors 30, 32 (FIGS. 2A-3B, 5-7) on the one hand and the hydrophobic surface 29 is between 1 μm and 100 μm or 500 μm, for example.

The catenaries 30, 32 for example appear as wires with a diameter between 10 μm and a few hundreds of μm, for example 200 μm. These wires may be gold or aluminium or tungsten wires or wires of other conducting materials.

The buried electrode is obtained by deposition, and then etching of a thin layer of a metal selected from Au, Al, ITO, Pt, Cu, Cr, . . . by means of standard techniques of microtechnologies. The thickness is from a few tens of nanometers to a few μm. The width of the pattern is from a few μm to a few nm (planar electrodes).

When two substrates 20, 120 are used (FIGS. 5-9B), they are distant by a distance between 10 μm and 100 μm or 500 μm, for example.

Regardless of the relevant embodiment, a drop of liquid 22 will have a volume between 1 nanoliter and a few microliters, for example, between 1 nm and 5 μl or 10 μl, for example.

In addition, each of the electrodes 24 will for example have a surface area of the order of a few tens of $\mu m^2$ (for example 10 $\mu m^2$) up to 1 $mm^2$, according to the size of the drops to be conveyed, the gap between neighboring electrodes for example being between 1 μm and 10 μm.

Structuration of the electrodes 24 may be achieved by standard methods of microtechnologies, for example by photolithography. The electrodes 24 are made by depositing a metal (Au, Al, ITO, Pt, Cr, Cu, . . . ) layer by photolithography.

The substrate is then covered with an $Si_3N_4$, $SiO_2$ dielectric layer . . . . Finally, deposition of a hydrophobic layer is carried out, such as for example a deposition of Teflon produced with a whirler.

Methods for making chips incorporating a device according to the invention may be directly derived from methods described in document FR-2 841 063: instead of making one catenary per row of electrodes, two are made or else a buried planar conductor and a catenary are made.

Buried conductors, and notably catenaries, may be made by depositing a conducting layer and etching this layer according to the suitable pattern of conductors, before depositing the hydrophobic layer.

An example of electrochemical detection of a redox species will be given. This detection is achieved by using a device according to the invention, for example the device of FIGS. 2A-2B.

A 1 μl drop of a potassium ferri-/ferro-cyanide ($10^{-2}$M) solution is deposited on the hydrophobic surface 29.

This drop is in contact with both catenaries 30, 32.

During the measurement, the catenary 30 which was used for the displacement, plays the role of a working electrode whereas the second electrode 32 plays the role of a counter electrode and reference electrode.

An electrochemical measurement is then achieved in cyclic voltamperometry with potential sweeps between −400 mV and +300 mV relatively to the reference electrode.

As shown in FIG. 11, a standard $Fe^{II}/Fe^{III}$ pair redox system is obtained.

More generally, with electrochemistry, it is possible to describe chemical phenomena coupled with mutual exchanges of electric energy.

The electrochemical reaction which occurs at the surface of an electrode, is the result of electric charge transfer through the interface between the latter and an electroactive species (in one direction or in the other).

Generally, two electrodes (working electrode and counter electrode) are immersed in an electrolytic solution containing an electroactive species.

A third electrode (reference electrode) is used for providing a reference for the potential of the working electrode.

Thus, when both electrodes are connected through a circuit with non-infinite resistance (the electrolyte is conducting), the non-zero current flows in the electrochemical cell. This flow involves three different mechanisms:

- In the electrodes, the current flows by displacement of electrons (charge carriers),
- at the electrode/liquid interfaces, the current flows by means of redox reactions which occur therein (transfer of electrons between electrode and solution or redox species),
- in the solution, the current flows by displacement of ions (charge carriers).

It is also possible to perform this electrochemical measurement between two electrodes, for example the electrodes of one of the devices as described above, in connection with FIGS. 2A-2B, 3A-3B, 5-7, 8B, 10A-10B:

- One of the electrodes of the device plays the role of a working electrode,
- the other one, the second electrode, plays both the role of counter electrode and of reference electrode.

Electrophoresis is a known method with which charged species may be separated. Indeed, charged molecules present in an electric field will begin to migrate towards electrodes of opposite charge. The migration rate will depend on the charge/mass ratio of the molecule, so that molecular species with different charges/masses may be separated effectively.

The electrodes of a device according to the invention, notably as described above in connection with FIGS. 2A-10B, may be used for inducing such an electrophoresis reaction in a drop of liquid.

The electrodes of a device according to the invention, notably as described above in connection with FIGS. 2A-10B, may also be used as a heating resistor:

- either by contact, the electrodes heating and transferring heat to the liquid of the drop 22,
- or by having a current flow between two electrodes, by using the liquid of the drop as a resistor which is heated by the Joule effect. In this case, it is not necessary that a direct, mechanical contact be established between the liquid of the drop and at least one of the electrodes. This type of heating may for example be induced in the configuration of FIGS. 9A and 9B.

The invention allows application of electrochemical detections or reactions, when at least one of the two electrodes is in physical contact with the drop.

It also allows application of electrophoretic reactions, or heating of the liquid of the drop 22.

The invention may also be applied to electroporation methods, with which the membrane of a cell (which then is the drop 22) may be opened and changed, and other chemical products brought by transport by means of the electrode, as described above or else brought manually, for example by means of a pipette, may thereby enter into the cell.

It may also be applied to cell lysis methods, with which the membrane of a cell may be burst, for example with a difference of voltages, applied to both electrodes 30, 32 of about a few volts, for example about 100 V/mm.

A first example of electrochemical detection of a redox species was given in connection with FIG. 11.

A second example relates to the electrochemical detection of a species generated by an enzyme.

A first reaction mixture is prepared as follows: 50 mM phosphate-citrate buffer, pH 6.5 (10 ml), o-phenylene diamine (OPD, 20 mg) and hydrogen peroxide (4 μl).

A second mixture is prepared as follows: MilliQ water (9 μl) and horse radish peroxidase (1 μl to 20 μM). A drop of 0.5 μl of the first mixture is caused to converge on the chip towards a 0.5 μl drop of the second mixture by applying a voltage of 50V. During this displacement, only the catenary 30 is involved. After 5 minutes of reaction at room temperature, and shielded from light, the product of the enzyme reaction is detected by differential pulsed voltamperometry by using the catenaries 30 and 32 as a pair of electrodes, the catenary 30 being used as a working electrode and the catenary 32 being used both as counter electrode and reference electrode. Thus, an oxidoreduction peak is obtained at −480 mV corresponding to the reduction of the generated enzymatic product (see FIG. 12).

A second example relates to the displacement of a drop followed by an electro-controlled localized variation of pH.

For certain applications, a drop from a reaction medium is displaced and then the pH is varied in order to either stop or start a reaction. Here, this pH is electrochemically varied by using the invention.

A drop of buffered solution (PBS pH 7.4) containing an indicator, 1 mM cresol red, is deposited on the chip and then displaced on the latter by applying a voltage of 50V. A potential of −1.4V for 10 s is then applied between both catenaries, 30 and 32, thereby causing hydrolysis of the water and generation of $OH^-$ ions. These $OH^-$ ions make the solution basic, hence the appearance of a red hue indicating a pH larger than 8.8. When the voltage is cut off, the buffer then compensates for the pH and the red hue disappears.

In FIGS. 13*a* and 13*b*, a device according to the present invention may be seen which uses two catenaries 30, 32, and with which the size of the drops may be controlled. Both of these catenaries are positioned at different heights relatively to the substrate.

The second catenary 32 allows a drop of liquid or a small volume of liquid 22 to be heated by contact or the Joule effect. Heating by heat transfer is preferred because the flow of the current in the drop may be too dependent on its contents, for example on its salt concentration. Heating by heat transfer means heating by contact, the electrodes heat up because of their internal resistance, by transferring heat to the liquid of the drop.

In addition, the flow of the current may also denature the substances in solution, which may alter possible subsequent analyses.

However, with current flowing between the catenaries 30, 32, an order of magnitude of the size of the drop may be determined advantageously, again allowing the evaporation to be even further controlled. When a drop is present and in contact with both catenaries 30, 32, a small current flows between both catenaries. Detection of this current informs on the presence of a drop 22 with a sufficient size for coming into contact, in the illustrated example, with the second catenary 32. This detection allows an approximate size of the drop to be determined.

In the illustrated example, the second catenary is positioned substantially parallel to the substrate at a distance d. The drop has a height h. When h is at least equal to d, a current flows between the catenaries 30 and 32, from which it may be inferred that the height h is at least larger than d. On the contrary, in the case when no current flows between the catenaries 30 and 32, it is known that h is less than d.

In FIG. 13*a*, in a first phase, the drop 22 has a height h larger than d and puts both catenaries 30, 32 into electric contact.

After partial evaporation of the drop 22, h is less than d, there is no longer any electric contact between these catenaries.

This system with two catenaries has the advantage of allowing both heating for accelerating evaporation and of allowing calibration of the drops. Indeed, it is possible to link the detection of the current with the displacement electrodes 4. Thus, the drop may be displaced on an evaporation path in one direction and in the other direction until current is no longer detected between both catenaries. It will then be known that the size of the drop is less than a given value. The displacement as for it promotes evaporation, and therefore accelerates the process. It is also possible to leave the drop in place, and to let the liquid evaporate until there is no longer any contact between the drop 22 and the catenary 32.

Third, fourth, . . . catenaries may also be provided, positioned at increasingly smaller distances from the substrate. This plurality of catenaries may allow the microfluidic device to be used for drops of different sizes, the size of the drop to be controlled over a whole evaporation path, by detecting continuous reduction in volume of the drop, or the size of the drops to be determined very finely.

These catenaries may also be positioned in parallel, at the same height as the displacement catenary but on the side and at different distances.

Second catenaries positioned transversely to the first catenary (as for example in FIG. 10B) in a discrete way and at increasingly smaller distances from the substrate, may also be contemplated. Controlling the size is then carried out in a selective way, when the drop encounters a second catenary.

Detection of a current may then generate a control intended to extend the evaporation of the drop in order to reduce the volume of the drop.

The invention claimed is:

1. A device for displacing a volume of liquid under effect of an electric control, comprising:
   - a first substrate with a hydrophobic surface including first electrical conductors, the first electrical conductors comprising multiple individual first electrical conductors;
   - a second electrical conductor positioned facing each of the first individual electrical conductors;
   - a third electrical conductor positioned facing each of the first individual electrical conductors wherein the second and third electrical conductors are substantially parallel to the hydrophobic surface; and
   - a controller programmed to control a voltage applied to the first electrical conductors, the second electrical conductor, and the third electrical conductor, wherein
   - the controller is programmed to create a first potential difference between the first electrical conductors and the second electrical conductor to cause displacement of the volume of liquid, and
   - the controller is programmed to cause a second potential difference between the second electrical conductor and the third electrical conductor that induces a reaction in the volume of liquid or analyzes the volume of liquid when the second electrical conductor and the third electrical conductor both receive voltage and current flows through the volume of liquid from or to the second electrical conductor and the third electrical conductor such that the controller is programmed to use the second electrode for both said displacement of the volume of liquid and also for said inducing an electrochemical reaction in the volume of liquid or said analyzing the volume of liquid.

2. The device according to claim 1, wherein the second electrical conductor includes a catenary or a wire, substantially parallel to the hydrophobic surface.

3. The device according to claim 2, wherein the catenary or the wire is non-buried in the first substrate, at a non-zero distance from the hydrophobic surface.

4. The device according to claim 3, wherein the non-zero distance is between 1 μm and 500 μm.

5. The device according to claim 2, wherein the third electrical conductor includes a catenary or a conducting wire.

6. The device according to claim 5, wherein the catenary or wire of the third electrical conductor is non-buried in the first substrate, at a non-zero distance from the hydrophobic surface.

7. The device according to claim 6, wherein the non-zero distance is between 1 μm and 500 μm.

8. The device according to claim 5, wherein both catenaries or wires of the second and third electrical conductors are parallel to each other and to the hydrophobic surface, and both catenaries or wires of the second and third electrical conductors face the first electrical conductors.

9. The device according to claim 5, wherein both catenaries or wires of the second and third electrical conductors are not parallel to each other, but are parallel to the hydrophobic surface.

10. The device according to claim 2, wherein the third electrical conductor includes a catenary or a wire directed perpendicularly to the catenary or wire of the second electrical conductor.

11. The device according to claim 1, further including a second substrate with a hydrophobic surface, the second substrate giving a confined structure to the device.

12. The device according to claim 1, wherein the third conductor is a catenary.

13. The device according to claim 11, wherein the hydrophobic surface of the second substrate is locally apertured to form a contact area between a drop of liquid positioned between both the first and second substrates and the third electrical conductor.

14. The device according to claim 11, wherein the second substrate is positioned at a distance from the first substrate, between 10 μm and 500 μm.

15. The device according to claim 1, wherein the second and third electrical conductors are a catenary or wire.

16. The device according to claim 11, wherein at least one of the hydrophobic surface of the first substrate or of the second substrate includes polytetrafluoroethylene.

17. A method for treating a cell by electroporation comprising:
   - putting a cell into contact with the device according to claim 1; and
   - applying a potential difference between the first electrical conductors and the second electrical conductor.

18. A device for calibrating a drop of liquid comprising:
   - the device according to claim 1; and
   - means for controlling a current flowing between the second and the third electrical conductors.

19. The device according to claim 18, wherein the second and the third electrical conductors each include a catenary, both catenaries being positioned at different heights relative to the hydrophobic surface.

20. The device according to claim 19, further including at least an additional catenary, positioned at a distance from the hydrophobic surface, different from a distance between the hydrophobic surface and the catenaries of the second and third electrical conductors.

21. The device according to claim 5, wherein both catenaries or wires of the second and third electrical conductors are disposed along non-intersecting directions and face the first electrical conductors.

22. The device according to claim 1, wherein both of the second and third electrical conductors are substantially parallel to the hydrophobic surface, both of the second and third electrical conductors facing a same first electrical conductor.

23. The device according to claim 1, wherein both of the second and third electrical conductors are substantially parallel to the hydrophobic surface, both of the second and third electrical conductors being disposed directly over a same one of said first electrical conductors.

24. A device for displacing a volume of liquid under effect of an electric control, comprising:
   - a first substrate with a hydrophobic surface including first electrical conductors, the first electrical conductors comprising multiple individual first electrical conductors;
   - a second electrical conductor positioned facing each of the first individual electrical conductors; and
   - a third electrical conductor positioned facing each of the first individual electrical conductors, wherein the second and third electrical conductors are substantially parallel to the hydrophobic surface, and wherein
   - a first potential difference between the first electrical conductors and the second electrical conductor causes displacement of the volume of liquid, and
   - both of the second and third electrical conductors are substantially parallel to the hydrophobic surface and to each other, both of the second and third electrical conductors being disposed directly over a same one of said first electrical conductors, such that the second electrical conductor is a dual function electrode for both displacement of the volume of liquid and also analysis of the volume of liquid.

25. The device of claim 1, wherein the controller is programmed to use the second and third electrodes to electrically induce a reaction in the volume of liquid and to electrically analyze the volume of liquid.

26. The device of claim 24, wherein the second and third electrical conductors electrically induce a reaction in the volume of liquid and electrically analyze the volume of liquid.

* * * * *